May 20, 1952 J. I. LYLE, III 2,597,740
TREE PULLING ARRANGEMENT
Filed Jan. 22, 1948
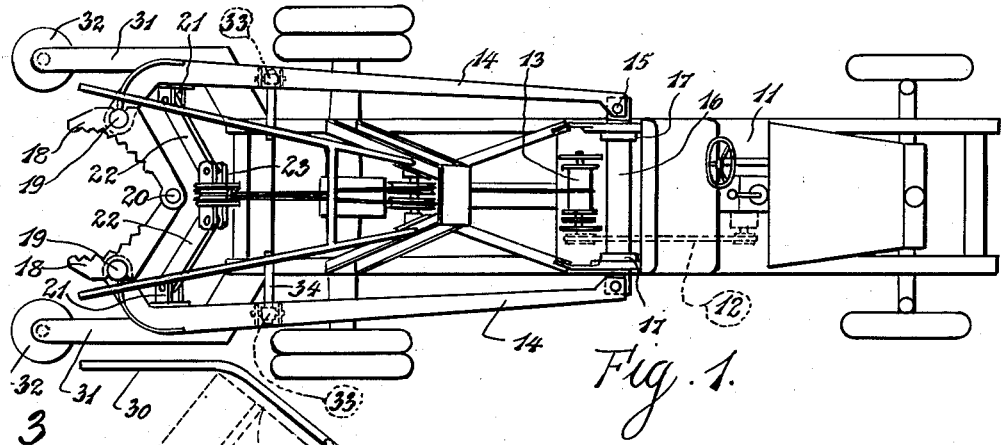
Fig. 1.
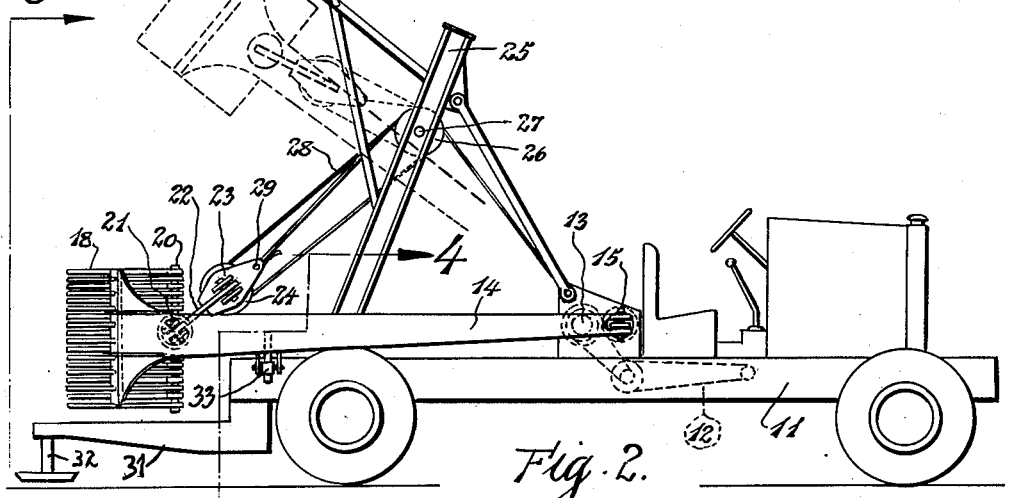
Fig. 2.
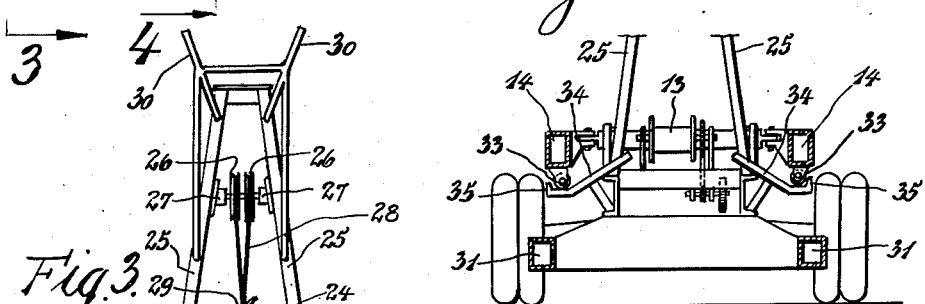
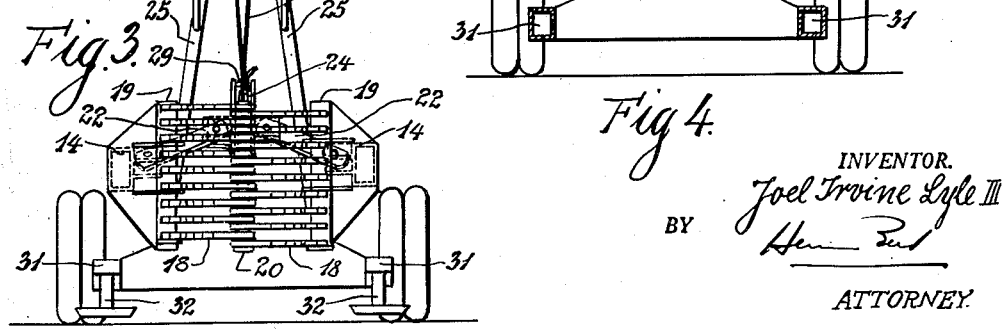
Fig. 3. Fig. 4.
INVENTOR.
Joel Irvine Lyle III
BY
ATTORNEY.

Patented May 20, 1952

2,597,740

UNITED STATES PATENT OFFICE 2,597,740

TREE PULLING ARRANGEMENT

Joel Irvine Lyle, III, Orlando, Fla.

Application January 22, 1948, Serial No. 3,670

19 Claims. (Cl. 254—128)

My invention relates to new and useful improvements in tree-pulling mechanism. This present application is a continuation-in-part of my copending patent application, filed February 28, 1945, Serial No. 580,232, now abandoned.

The general object of this invention is to provide a rugged, yet relatively inexpensive, tree-pulling mechanism, adapted (if desired) to be mounted upon an ordinary truck, tractor, or trailer, to provide an efficient means for clearing woodland for farming purposes, roads, airports, and other operations which require the removal of trees, including the removal of their roots.

More specific objects are as follows:

1. To provide new and more efficient means whereby jaws, pivotally supported by, or otherwise braced upon the carrying vehicle, will grip and then pull the tree upwards out of the ground.

2. To provide new and more efficient means whereby the same pulling force is exerted first to grip the tree securely, and then automatically to pull the tree upwards out of the ground.

3. To provide means whereby the mere placing of the jaws against the tree, by the horizontal movement of the vehicle, will give an initial set to the jaws.

4. To provide means, not necessarily a hinge, to prevent relative vertical movement of the two jaws, while in lifting engagement with a tree.

5. To provide means whereby the gripping force may be increased relative to the lifting force, to compensate for the lessening of total force due to the loss of ground-reaction after the tree leaves the ground.

6. To provide means other than actual contact of parts, to limit the extent of upward lift.

7. To reduce overhead clearance for any given height of maximum lift.

8. To provide means for reopening the jaws when they are lowered.

9. To provide self-cleaning jaws.

10. To provide guard means to prevent the tree, when pulled, from toppling sidewards or onto the machine.

11. To provide outrigger jacks which will automatically bear against the ground in the vicinity of the tree to transmit to the ground a part of the operating reactions of the machine.

12. To provide means to prevent the jaws from becoming toggled open.

In addition to the objects above stated, I have worked out a number of novel and useful details, which will become readily evident as the description progresses.

My invention consists in the novel parts, and in the combination and arrangement thereof, which are defined in the appended claims, and of which one embodiment is exemplified in the accompanying drawings, which are hereinafter particularly described and explained.

Throughout the description, the same reference number is applied to the same member or similar members.

Referring now to the accompanying drawings, it will be seen that:

Figure 1 is a plan view of my invention, mounted on a truck chassis.

Figure 2 is a side elevation of the same, showing in solid lines my invention in lowered position, and in dotted lines my invention in raised position.

Figure 3 is a rear elevation of the same, taken along the lines 3—3 of Figure 2.

Figure 4 is a transverse vertical section of the same, taken along the lines 4—4 of Figure 2.

Referring now to the figures we see that 11 represents an ordinary truck chassis, having the usual wheels, power plant, and other elements of a conventional motor-vehicle, none of which, per se, constitute a part of my invention.

A power take-off 12, from the engine of the truck, serves a winch 13, mounted on the chassis-frame behind the driver's seat.

This winch mechanism serves a derrick which forms a part of my tree-pulling mechanism, now to be described.

Arms 14 extend lengthwise of the vehicle frame, one arm being on each side thereof as illustrated. These arms, at one end thereof, are hingedly connected, as at 15, to cross-axis member 16, in such manner as to permit vertical angular movement about the axis thereof, as well as angular movement relative to each other in the plane of the arms.

This cross-axis member 16 may be built sufficiently sturdy so as to serve as a torsion-box, in which event it should be journaled on the frame as at 17, 17. If not thus sturdily built, it may be thus journaled, or it might be rigid with the frame, and provided with gimbal joints connecting its ends to the ends of arms 14 at 15, 15.

The other ends of each arm 14 extends beyond the chassis proper. At this end, each arm 14 is bent inwardly toward the other arm, and carries at the extremity of this bent portion a jaw 18. If desired, these jaws can be slightly inclined inwardly upwardly, to conform to the slight taper of the average tree trunk, the slight torsional flexibility of the arms taking care of any variation therefrom.

Each jaw 18 consists preferably of a series of vertically spaced serrated plates. The serrations serve as teeth to grip the tree. The spaces serve as exit points to permit the escape of bark and scraped pieces of wood, which otherwise might clog the jaws and prevent the teeth from taking a firm grip.

Each jaw 18 is preferably, but not necessarily hinged to its arm 14, about a vertical axis, as at 19.

Those ends of the jaws which are nearer to the vehicle are preferably intermeshed. This intermeshing and/or the torsion-box 16 serve to prevent relative vertical movement of the two jaws while in lifting engagement with a tree.

If the jaws are hinged to the arms, as above suggested, then preferably so as to prevent them from flopping loosely and thus not evenly engaging the tree, they should be hinged together where they mesh, about a vertical axis, as at 20. Such hinge, to prevent it from becoming toggled, should be so located that a horizontal circular arc through hinge 19, centered at connection 15, will pass well to the rear of hinge 20 when the arms are at their widest possible spread.

On each arm 14, preferably on the inner face thereof, and preferably as far to the rear as possible (for example, near the elbow of the arm), there is an attachment 21, preferably swiveled to the arm on a substantially horizontal substantially transverse axis. From each such attachment 21, there extends inwardly at least one link 22, which is hinged to a member 23. This member, as shown, carries at least one sheave 24.

On the chassis there is an elevated support 25, which carries at least one sheave 26, pivoted at 27.

A rope 28 extending from winch 13 around sheave 26, around sheave 24, again around sheave 26 to an anchorage 29 serves, at the will of the operator, to raise or lower arms 14, and jaws 18 carried thereby. If there were no sheave 24, rope 28 would, of course, extend from the sheave 26 direct to anchorage 29.

Other means than the block-and-tackle means just described, could be used to cause axis 21 to approach axis 27.

One very important inventive detail of my apparatus is the relative location of axes 15, 21 and 27. The distance of 27 from 15 should preferably be materially less than the distance from 15 to 21. In fact the first distance should be sufficiently less than the second so that the parts carried by the arms (i. e., member 23, sheave 24, etc.) can never come block-to-block with the parts carried by the support 25 (i. e., sheave 26, etc.), and/or so that the distance from axis 15 to a line joining axes 21 and 27, will become rapidly and materially shortened as the inclination of arms 14 to the horizontal increases. The reasons for all this will become readily evident, when later herein I describe the operation of my apparatus.

Support 25 carries, adjacent its top, guards 30 suitably braced. The object of these guards will be explained later herein.

Diverging rearwardly from the chassis, I provide jack-arms 31, equipped with ground-engaging jacks 32. For reasons which will later appear, these jacks need not be vertically adjustable.

Downwardly projecting from each arm 14, preferably near the jaw-holding end thereof, is a roller 33. This is advisable, not essential. To co-operate with each such roller, the chassis carries a track 34, preferably downwardly outwardly inclined, with a stop 35 at the outer end thereof. The objects of these co-operating rollers and tracks will be explained later herein.

The operation of my apparatus is as follows.

With arms 14 lowered and jaws 18 open, the vehicle is backed toward a tree. The effect of jamming the jaws against the tree is to cause a partial closing of the jaws about the tree-trunk at a very low point thereof, thus giving the jaws an initial set thereon.

The winch 13 is then actuated to draw in on rope 28. It will be appreciated so long as the jaws are around the tree, partial closing of the jaws may be effected by actuation of the winch to draw in on a rope 28; it is not necessary that the jaws be jammed against the tree. This pulls member 23 toward axis 27. Inasmuch as links 22 are initially at a very obtuse angle to each other, the first effect of this pull, resisted as it is by the firm anchorage of the tree-roots in the ground is to draw the arms 14 together, thus causing the jaws 18 to grip the tree with terrific force.

As soon as the jaws 18 have firmly gripped the tree, the entire available line-pull will be exerted to pull upwardly on the tree.

The reaction in the machine to this upward pull on the tree, is a downward pull on the rear end of the machine. This quickly compresses the rear tires and/or springs (if any) and lifts the front wheels off the ground, thus lowering the rear end of the machine and thereby forcing the jacks 32 down into engagement with the ground, without putting anyone to the bother of screwing them down. Thereafter the reaction is transmitted to the ground through the jacks and the rear wheels, the major portion of the reaction being taken by the jacks.

Finally the roots of the tree give way, and the tree is bodily lifted.

But the moment that the tree is no longer held by the ground, the downward reaction of the ground is no longer added to the weight of the tree (and the dirt held thereby) and the weight of the jaws and arms. Thus the line-pull is considerably slackened, and the grip on the tree proportionally so. However, the relative locations of points 15, 21, and 27 now come into play; for as the tree is lifted, the lever-arm between the pivot 15 and the direction of pull of the ropes is shortened, thus increasing the tension in the ropes, and thereby increasing the ratio of the gripping force to the weight which is being lifted.

As a further result of the relative location of points 15, 21 and 27, sheaves 24 and 26 can never come block-to-block, but are limited instead merely by the line-pull which the winch can exert. This prevents damage to the block-and-tackle mechanism, and also permits higher raising of the tree with a machine of less height (except for the guards 30, which are not necessary, although convenient) than otherwise.

The object of the guards 30 is to prevent the tree, after being pulled, and especially while being carried, from toppling sideways, or from toppling onto the machine.

By this time, if not before, the truck will have settled forward again onto its front wheels, thus lifting the jacks 32 off the ground, so that they will not interfere with the locomotion of the truck.

When the tree has been raised, the truck can transport it, still clasped by the jaws, to wherever the operator wishes to dump it. Upon arriving at the dump, the rope 28 is payed out, thus lowering the tree. The jaws gradually release their grip.

The jar of the tree-roots against the ground is usually sufficient to release the jaws completely. The truck can then topple the tree over by backing a bit further, or the tree can be left standing, as desired.

When the jaws have been freed from the tree, the reaction on links 22 by the weight of arms 14 and jaws 18 pulling down, and rope 28 pulling diagonally upward, would tend to draw the arms together thus closing the jaws. But this is where my rollers 33 and co-operating roller-tracks 34 come into play.

Even if these tracks 34 be not inclined, yet if attachments 21 be not swiveled, the weight of links 22 and member 23, acting against the upward reaction of tracks 34 against rollers 33, would be sufficient to spread arms 14, and thus open jaws 18. But, even in such a situation as this, an inclination of tracks 34 would assist. And, if attachments 21 are swiveled, then it is essential that tracks 34 be inclined; or that some auxiliary spreading means be employed.

The stops 35 on the outer ends of tracks 34, limit the travel of rollers 33, and thus prevent jaws 18 from becoming toggled open, as would occur if the jaws were permitted to open far enough so that pivot 20 would lie to the rear of a horizontal circular arc through hinge 19, centered at connection 15. Other means, such as on the jaws themselves, could be employed to prevent such toggling, but I prefer means (such as shown) applying directly to arms 14, inasmuch as such means relieve the parts of strain.

Having now described and illustrated one form of my invention, I wish it to be understood that my invention is not to be limited to the specific form or arrangement of parts herein described and shown, except as specifically covered by my claims.

I claim:

1. In a device for uprooting and transporting trees, for attachment to a supporting vehicle, the combination of: two laterally spaced longitudinally extending arms; a fixed mounting for one end of each arm on the vehicle, for pivotal movement with respect to the vehicle about a substantially horizontal axis, and about an axis substantially perpendicular to the arm and to the horizontal axis, the horizontal axes of the said two mountings being substantially coaxial; two grasping jaws, each carried by that end of one arm remote from its mounting on the vehicle, said jaws being hingedly connected to each other to permit grasping and ungrasping horizontal movement of the two jaws to and away from each other and to prevent relative vertical translation thereof; and common means for first drawing together and then raising the jaw-holding ends of the two arms.

2. A device according to claim 1, further characterized by the fact that the common means comprise: two connecting rods, each hingedly connected to one of the arms, and extending inwardly toward the other arm, said two rods being hingedly connected to each other, the axes of the three hinged connections being substantially parallel to each other; and means for pulling on the joined ends of the two rods; thereby first drawing together the projecting ends of the arms, and then raising them.

3. A device according to claim 2, further characterized by the fact that each hinge-connection of a connecting rod to an arm is swiveled to that arm on a substantially horizontal axis, the two swivels being substantially coaxial.

4. A device according to claim 3, further characterized by the fact that the pulling means includes a pivot, the axis of said pivot, in all positions of the arms, being disposed materially closer to the axis of pivotal mounting of the arms on the vehicle, than the distance from such mounting to the axis of swivel connection of the rods to the arms.

5. A device according to claim 1, further characterized by the fact that the hinged connection between the two jaws is on a substantially vertical axis.

6. A device according to claim 5, further characterized by having means to prevent the jaws from opening to such an extent that they will become toggled open at said last-mentioned pivotal connection.

7. A device according to claim 1, further characterized by having a pair of guards, elevated above the point of highest lift of the jaws, and projecting in the same direction as the jaws, to protect the tree against toppling sidewards or toward the vehicle.

8. In a device for uprooting and transporting trees, for attachment to a supporting vehicle, the combination of: two laterally spaced longitudinally extending arms; a fixed mounting for one end of each arm on the vehicle, for pivotal movement with respect to the vehicle about a substantially horizontal axis, and about an axis substantially perpendicular to the arm and to the horizontal axis; the horizontal axes of the said two mountings being substantially coaxial; two grasping jaws, each carried by that end of one arm remote from its mounting on the vehicle; common means for first drawing together and then raising the jaw-holding ends of the two arms; and means to automatically open the jaws upon the arms being lowered to a predetermined position.

9. A device according to claim 8, further characterized by the fact that the common means comprise: two connecting rods, each hingedly connected to one of the arms, and extending inwardly toward the other arm, said two rods being hingedly connected to each other, the axes of the three hinged connections being substantially parallel to each other; and means for pulling on the joined ends of the two rods; thereby first drawing together the projecting ends of the arms, and then raising them.

10. A device according to claim 9, further characterized by the fact that the jaw-opening means comprise means to prevent the arms from being lowered beyond a predetermined distance.

11. A device according to claim 10, further characterized by the fact that the jaw-opening means comprise two transversely extending tracks, one being beneath each arm, and so positioned that the weight of the arms and associated parts will force the arms apart as the arms engage these tracks.

12. A device according to claim 11, further characterized by the fact that the two transverse tracks extend downwardly and outwardly.

13. A device according to claim 12, further characterized by the fact that each arm engages its track through a roller carried by the arm.

14. A device according to claim 13, further characterized by the fact that each track has at its outer end a stop to limit the outward travel of the roller, and thus limit the spread of the arms.

15. In mobile tree-uprooting mechanism, the combination of a vehicle chassis carrying a power plant, a retaining axle member supported on said chassis and extending laterally thereof, a plurality of arms universally pivoted adjacent the ends of said arms on said member and adapted to pivot thereabout, said arms extending longitudinally of the vehicle chassis, gripping jaws hingedly secured to said arms and to one another, a housing, a pulley supported in said housing, connecting rods hinged to said housing and to said arms, a derrick mounted on said chassis having a pulley thereon, a winch, a power take-off from the power plant of the vehicle, said winch being connected to said power take-off, and a cable connecting said winch to said pulleys, said connecting rods upon actuation of the pulleys moving said arms to close the gripping jaws upon a tree to be uprooted and then pivoting said arms about the axle member to uproot the tree.

16. In mobile tree-uprooting mechanism, the combination of a vehicle chassis, a power plant thereon to move the chassis from place to place, a retaining axle member supported on said chassis and extending laterally thereof, a plurality of arms mounted on said member adapted to pivot horizontally and vertically thereabout and to move toward one another, said arms being spaced from each other and extending longitudinally of the chassis, gripping jaws hingedly secured to said arms and hinged to one another, a housing having a pulley therein, connecting rods hinged to said housing and to said arms, a derrick mounted on said chassis having a second pulley thereon, a winch, a power take-off from the power plant of the vehicle, said winch being connected to the power take-off, and a cable connecting said winch to said pulleys, actuation of the winch raising the housing thereby pivoting the connecting rods about the housing and the arms and pivoting the arms about the retaining member to move the ends of the arms laterally toward one another to close said jaws upon a tree to be uprooted and upon further upward movement of the housing, pivoting the arms about the axle member in a different direction to uproot the tree.

17. Mobile tree-uprooting mechanism according to claim 16 in which the jaws include a series of teeth adapted to grip the trunk of a tree, the teeth biting beneath the surface of the bark, said teeth being spaced from one another with an opening between adjacent teeth so that bark and other debris may pass between the adjacent teeth, the teeth of engaging jaws being arranged in overlapping relationship so that the teeth of one jaw are in staggered relation with respect to the teeth of the other jaw when in trunk-gripping position.

18. Mobile tree-uprooting mechanism according to claim 16 in which a plurality of support members are mounted on the chassis, each support member being supported on the frame of the chassis and comprising a supporting arm with a flat platform end at the bottom thereof, the platform end being substantially parallel to the ground but elevated a predetermined distance thereabove, said platform being adapted to support the chassis and relieve the strain from the tires and springs of the truck when the truck sags during a tree pulling operation.

19. In mobile tree-uprooting mechanism, the combination of a vehicle chassis, a power plant thereon to move the chassis from place to place, a retaining axle member supported on said chassis and extending laterally thereof, a plurality of arms mounted on said member, each member being universally pivoted thereon to move toward one another and to permit movement in a different direction, said arms being spaced from each other and extending longitudinally of the chassis, gripping jaws carried by said arms, a housing, connecting rods hingedly secured to said housing and said arms, and means for raising said housing thereby pivoting the connecting rods about the housing and the arms and pivoting the arms about the retaining member to move the ends of said arms laterally toward one another to close the jaws upon a tree to be uprooted and upon further upward movement of the housing, pivoting the arms about the retaining member in a different direction to uproot the tree.

JOEL IRVINE LYLE, III.

REFERENCES CITED

The following references are of record in the file of this patent:

UNITED STATES PATENTS

| Number | Name | Date |
| --- | --- | --- |
| 676,599 | Bergom | June 18, 1901 |
| 1,202,681 | Temple et al. | Oct. 24, 1916 |
| 1,437,547 | Pope | Dec. 5, 1922 |
| 1,884,861 | Remde | Oct. 25, 1932 |
| 2,025,340 | Crocker | Dec. 24, 1935 |
| 2,189,052 | Anthony | Feb. 6, 1940 |
| 2,345,789 | Brooks | Apr. 4, 1944 |
| 2,436,510 | Ferguson | Feb. 24, 1948 |